United States Patent [19] [11] 4,213,836
Freund et al. [45] Jul. 22, 1980

[54] LASER-INDUCED SEPARATION OF HYDROGEN ISOTOPES IN THE LIQUID PHASE

[75] Inventors: Samuel M. Freund; William B. Maier, II; Willard H. Beattie; Redus F. Holland, all of Los Alamos, N. Mex.

[73] Assignee: The United States of America as represented by the United States Department of Energy, Washington, D.C.

[21] Appl. No.: 839,238

[22] Filed: Oct. 4, 1977
(Under 37 CFR 1.47)

[51] Int. Cl.² .............................................. B01J 1/10
[52] U.S. Cl. ........................ 204/157.1 R; 204/158 R; 204/162 R; 204/DIG. 11
[58] Field of Search ............................... 204/DIG. 11; 157.1 R, 158 R, 162 R

[56] References Cited

U.S. PATENT DOCUMENTS

| | | | |
|---|---|---|---|
| 3,904,500 | 9/1975 | Jenson | 204/DIG. 11 |
| 3,947,335 | 3/1976 | Marling | 204/DIG. 11 |
| 3,983,020 | 9/1976 | Moore et al. | 204/DIG. 11 |
| 4,025,408 | 5/1977 | Marling | 204/DIG. 11 |
| 4,049,515 | 9/1977 | Robinson et al. | 204/157.1 R |
| 4,081,339 | 3/1978 | Benson | 204/158 R |

OTHER PUBLICATIONS

Marling, J. Chem. Phys., 66, 4200 (1977).

Primary Examiner—Howard S. Williams
Attorney, Agent, or Firm—R. V. Lupo; Edward C. Walterscheid; Paul D. Gaetjens

[57] ABSTRACT

Hydrogen isotope separation is achieved by either (a) dissolving a hydrogen-bearing feedstock compound in a liquid solvent, or (b) liquefying a hydrogen-bearing feedstock compound, the liquid phase thus resulting being kept at a temperature at which spectral features of the feedstock relating to a particular hydrogen isotope are resolved, i.e., a clear-cut isotope shift is delineated, irradiating the liquid phase with monochromatic radiation of a wavelength which at least preferentially excites those molecules of the feedstock containing a first hydrogen isotope, inducing photochemical reaction in the excited molecules, and separating the reaction product containing the first isotope from the liquid phase.

12 Claims, 3 Drawing Figures

LASER-INDUCED SEPARATION OF HYDROGEN ISOTOPES IN THE LIQUID PHASE

BACKGROUND OF THE INVENTION

The invention described herein relates to a method for separating the isotopes of hydrogen, and more specifically to a method wherein the isotopes of hydrogen are separated as a result of isotope preferential or selective photochemical reaction in the liquid phase.

The Candu fission reactor employs natural uranium rather than enriched uranium as its fuel. To do this, however, requires the use of heavy water ($D_2O$) as the moderator and coolant. The separation of hydrogen isotopes in quantities sufficient to meet the large amounts of heavy water required constitutes a significant portion of the cost of Candu reactors. At present, most of the heavy water is produced by the Girdler sulfide process, a process which requires large quantities of $H_2S$ at high pressure. Since $H_2S$ in quantities larger than a few parts per million is poisonous, the accidental release of this material represents a significant potential health hazard in the use of the Girdler process. Thus, another efficient and economical means of achieving the required hydrogen isotope separation is highly desirable.

Laser-induced separation of hydrogen isotopes is known in the art. To accomplish laser-induced separation of hydrogen isotopes by photochemical techniques requires the following requirements to be met: (1) A chemical compound of hydrogen must be available which has optical absorption features for which the absorption varies rapidly with wavelength and which appear at different wavelengths for different hydrogen isotopes, i.e., there must be a well delineated isotope shift, so that the excitation can be preferentially induced in isotopically distinct molecules of the compound. (2) The excited molecules must then either spontaneously undergo or be induced to undergo some sort of chemical change more rapidly than the unexcited molecules. (3) The product hydrogen compound or molecule which results must possess properties which permit its separation by physical or chemical means from the reactant or feed hydrogen compound. The separated hydrogen-bearing product molecules will then be isotopically enriched. It will be apparent that the degree of enrichment will depend upon the amount of selectivity in the excitation and photochemical reaction steps and the amount of scrambling which occurs before the product hydrogen-bearing molecules are separated from the reactant or feed hydrogen compound. By scrambling is meant any chemical or physical process the effect of which is to exchange isotopes or excitation and which results in a lesser degree of selectivity.

Various methods for the laser-induced photochemical separation of hydrogen isotopes using gaseous feed materials are known in the art. Formaldehyde is known to be quite useful as a feed material in laser-induced hydrogen isotope separation. See, e.g., Jack Marling, "Isotope Separation of Oxygen-17, Oxygen-18, Carbon-13, and Deuterium by Ion Laser Induced Formaldehyde Photopredissociation," J. Chem. Phys. 66, 4200 (1977).

For a separation scheme to be most economical, it is necessary to handle large quantities of the feed material, and it is helpful if the apparatus for handling this material is not too complex. These two facts suggest that economical laser-induced isotope separation is more easily accomplished if the molecular density of the hydrogen-bearing feed material is reasonably high. Moreover, the foregoing requirements must be capable of being met in a practical environment envisioned for a given isotope separation scheme. It will be apparent that for efficient, large-scale isotope separation, this environment will preferably be a flowing one. Finally, the raw or feed materials should be inexpensive and the separation of the products simple.

Heretofore the art has disclosed laser-induced hydrogen isotope separation methods in which the irradiation occurs to a feed material in the gaseous phase. But to meet the foregoing criteria, it would be highly advantageous to perform the irradiation of the feed material when it is in a liquid phase. The published literature does not disclose any method for achieving laser-induced isotope separation using a feed material in the liquid phase.

A basic reason why laser-induced isotope separation methods based on irradiation in the liquid phase have not heretofore been reported is that the spectral features exhibited by compounds in the liquid state or in solution at or near room temperature (300° K.) are considered to be substantially broader than the isotope shift so that condition (1) listed herein cannot be met.

SUMMARY OF THE INVENTION

We have found that when a compound containing a mixture of hydrogen isotopes is liquified or placed in solution in an appropriate solvent and sufficiently cooled, spectral features of the compound are sufficiently narrowed that a clear-cut isotope shift is delineated, and selective or at least preferential excitation of those molecules containing a particular hydrogen isotope is readily achieved by irradiating the solution with monochromatic radiation of the proper wavelength. This excitation provides the basis for hydrogen isotope separation in the liquid phase using photochemistry.

In its broad sense our invention encompasses a process for separating hydrogen isotopes which comprises (a) forming a liquid phase of a hydrogen-bearing feedstock compound at a temperature at which the spectral features of the feedstock compound are narrow enough or the absorption edges sharp enough to permit spectral features corresponding to the different hydrogen isotopes to be separated to be distinguished, (b) irradiating the liquid phase at this temperature with monochromatic radiation of a first wavelength which selectively or at least preferentially excites those molecules of the feedstock compound containing a first hydrogen isotope, and (c) subjecting the excited molecules to physical or chemical processes or a combination thereof whereby the first hydrogen isotope contained in the excited molecules is separated from other hydrogen isotopes contained in the unexcited molecules.

In a preferred embodiment, the feedstock compound is dissolved in a cryogenic solvent such as liquid Xe, Kr, CO, $O_2$, or $Cl_2$. Suitable feedstock compounds include but are not limited to, formic acid, formaldehyde, tetrazine, methane, ketene, and silane. When formaldehyde dissolved in liquid Xe or liquid Kr is irradiated with 325 nm radiation, hydrogen gas enriched in deuterium bubbles from the solution. The molecular density of formaldehyde in cryogenic solution can be much higher than for the room temperature gas where at densities above about $5 \times 10^{17}$ molecules/cm$^3$ polymerization rapidly occurs. Such polymerization precludes effective isotope separation.

LASER-INDUCED HYDROGEN ISOTOPE SEPARATION IN LIQUID PHASE

Figure 1:
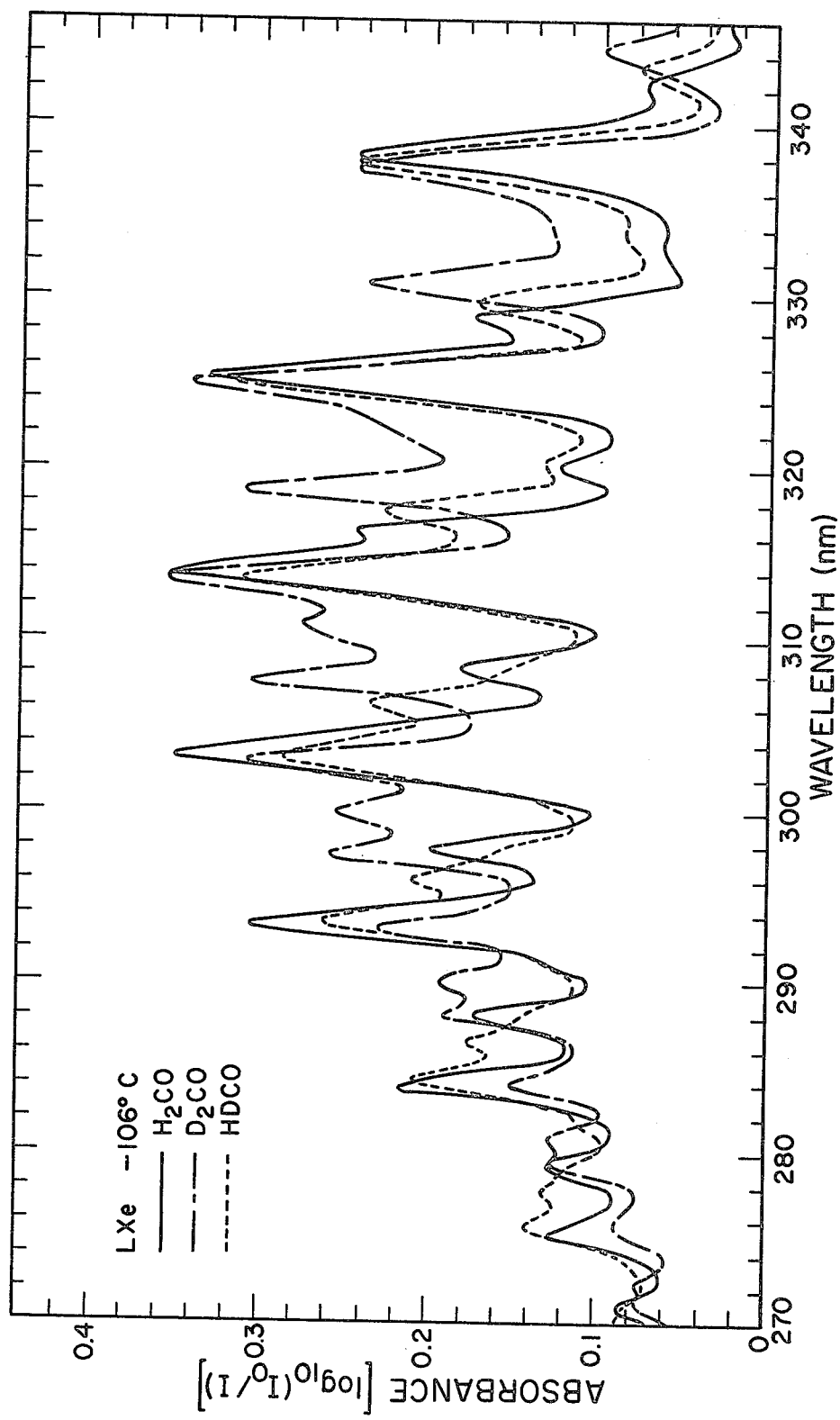
FIG. 1 shows absorption spectra of formaldehyde dissolved in liquid Xe.

The invention requires that (a) in the liquid phase there be spectral selectivity between the feed molecules containing H and D; (b) the excited feed molecules be capable of photochemical activity; (c) sufficient isotope selectivity be maintained during photolytic reactions, i.e., there be little scrambling; and (d) the enriched reaction product be capable of being separated from the feed compound and other reaction products.

In the proper solvents and at sufficiently low temperatures, ultraviolet absorption features corresponding to electronic transitions are routinely observed to be sufficiently narrow to permit selective excitation of hydrogen- and deuterium-containing molecules. In the proper solvents and at sufficiently low temperatures, infrared absorption features corresponding to vibrational transitions are routinely observed to be sufficiently narrow to give extremely high contrast ratios (almost completely isotopically selective excitation) of hydrogen- and deuterium-containing molecules. Spectral regions free of solvent and scavenger absorption bands can be found over the whole spectral range of interest, from 200–40,000 nm.

Hydrogen isotope separation in accordance with one embodiment of the present invention involves the following elements: (a) a solvent which is a liquid in the desired temperature range; (b) a hydrogen-bearing feed compound which is reasonably soluble in the liquid solvent in the desired temperature range; (c) irradiation of the solution with monochromatic radiation of one or more wavelengths; (d) a product compound or molecules preferentially or selectively enriched in one istope of hydrogen, and (e) other product compounds. Frequently, also involved is an additional element (f), a scavenger compound which is reasonably soluble in the liquid solvent in the desired temperature range or which can actually be the solvent itself.

The feed and scavenger compounds are dissolved in the liquid solvent at a temperature at which the feed and scavenger compounds react slowly or not at all and the spectral features of the feed compound are narrow enough or the absorption edges sharp enough to permit the spectral features corresponding to the different isotopes to be separated to be distinguished. It is critical to the process of this invention that the solution when irradiated be at a temperature at which there is a clearly delineated isotope shift in the absorption features of the feed compound. That is to say, there must be absorption features for each isotope which are sufficiently nonoverlapping to permit preferential excitation of a particular isotopic species and preferably selective excitation of that species. This temperature may be substantially below room temperature but depending upon the particular reactants may not necessarily be so. It will be apparent that the reaction of the feed and scavenger compounds in solution reduces the efficiency of the isotope separation and, if sufficiently rapid, may preclude it altogether. Thus, in the absence of photoexcitation, the feed and scavenger compounds should react slowly or not at all.

While at the desired temperature, the solution is irradiated with monochromatic radiation of one or more wavelengths. Monochromatic radiation is here defined to be electromagnetic radiation which has a sufficiently small spectral bandwidth to interact selectively or at least preferentially with those molecules of the reactant compound containing a particular isotope. Spectral bandwidths of $\sim 100$ cm$^{-1}$ are probably adequate to separate isotopically labeled hydrogen compounds, and several suitable radiation sources, including lasers, are readily available. The wavelengths of the monochromatic radiation are selected to assure selective or at least preferential excitation of those molecules of the feed compound containing a particular isotope and subsequent photochemical reaction of these excited molecules under conditions at which there is little or no photochemical reaction of the unexcited molecules of the feed compound.

This photochemical reaction may take the form of (a) an enhanced reaction of the excited molecules with the scavenger compound, (b) photodissociation of the excited molecules, or (c) photodissociation followed by reaction of one or more of the photodissociation products with the scavenger compound. The action of the scavenger compound may thus, for example, be to reduce or oxidize the feed compound, to substitute one of the scavenger molecule's atoms for that of the feed compound, or to react with the photodissociation products before they can recombine to form the feed compound.

The monochromatic radiation employed may be either infrared, visible, or ultraviolet radiation, or a combination of infrared and visible or ultraviolet, depending upon which of the following photochemical processes is used:
(a) A chemical reaction enhanced by vibrational excitation corresponding to the absorption of a single infrared photon in the feed molecule.
(b) A chemical reaction enhanced by, or a photodissociation produced by, electronic excitation corresponding to the absorption of a single photon by the feed molecule.
(c) A chemical reaction enhanced by, or a photodissociation produced by, electronic excitation corresponding to the absorption of two photons of differing energy by the feed molecules: (i) The first photon absorbed leaves isotopically selected feed molecules in an excited vibrational state, and the second absorbed photon preferentially produces electronic excitation in the vibrationally excited molecules. (ii) The first photon absorbed raises the feed molecule to a relatively long-lived, excited electronic state in which vibrational excitation is selectively induced by the absorption of an infrared photon.
(d) A chemical reaction enhanced by, or a photodissociation produced by, absorption of two or more infrared photons of the same or similar energy by the feed molecules.

Isotopic selectivity is accomplished through the absorption of an infrared photon in photochemical processes (a), (c), and (d) and through the absorption of a single photon to produce an excited electronic state in photochemical process (b).

The isotopically enriched product compound which results from the photochemical reaction is chemically and physically different from the product compound and can be separated from it in various ways well known in the chemical arts, as, e.g., by filtration of a precipitate, by decanting the liquid solution, by a recrystallization process, distillation, or by further chemical reaction.

While the feed and scavenger compounds are not required to have a high degree of solubility in the solvent, the solubility of the feed compound at the temperature of interest should be such as to produce a sufficiently high molecular density to interact efficiently with the monochromatic radiation. Likewise, the solubility of the scavenger should be sufficient to produce rapid reaction of the scavenger molecules with the excited feed molecules or the photodissociation product or products thereof. It will be apparent that the solvent and the scavenger compound must not absorb the monochromatic radiation to any significant degree and they preferably should not contain the element having isotopes desired to be separated.

It should be noted that a scavenger compound is not automatically required in all embodiments of the invention. Thus, in some instances, as, e.g., the preferred embodiment described herein, an isotope-enriched photodissociation product may be stable and readily capable of being separated from the solution of the feed compound. In such an instance, it will be apparent that no scavenger is required. Further, in certain embodiments, the scavenger compound may also serve as the liquid solvent for the feed compound. The solvent need not necessarily be in a single compound or element but may in some embodiments be a combination of compounds or elements or both. In addition, a suitable solvent need not even be a liquid at or near room temperature. Thus, certain preferable solvents for use in hydrogen isotope separation, namely, Kr and Xe, are cryogenic liquids which boil, respectively, at $-153°$ and $-109°$ C. (STP). Liquids are also used at temperatures above their normal boiling points by pressurizing them with their own vapor. Other suitable solvents include CO, $O_2$, and $Cl_2$. Suitable feed compounds include formic acid, formaldehyde, tetrazine, methane, ketene, and silane. Finally, the feed compound may in certain embodiments be formed in the liquid solvent by reaction of predecessor materials introduced therein.

In still other embodiments, no solvent may be required. That is to say, the hydrogen-bearing feed compound itself may be in the liquid state. This may be accomplished by choosing a feed material which is normally a liquid at or near room temperature or alternatively selecting a gaseous feed material which may be cooled sufficiently to liquify. An example of the latter situation is provided by the reagents taught by U.S. Pat. No. 4,025,408. That patent discloses a method for deuterium enrichment using a gaseous mixture of a hydrogen halide feedstock and an unsaturated aliphatic compound, particularly an olefin. U.S. Pat. No. 4,025,408 is hereby incorporated into this application by reference. In accordance with the present invention, these reagents would be cooled sufficiently to liquify and the liquid phase would then be irradiated.

DESCRIPTION OF THE PREFERRED EMBODIMENT

Gaseous formaldehyde has predissociating electronic states that are excited by radiation of a wavelength ≲350 nm. Absorption spectra of $CH_2O$, $CHDO$, and $CD_2O$ have rotational lines spectrally resolved from each other, so that any of these gaseous species can be preferentially excited by laser light in the presence of the others.

In solution, one does not expect to find resolved rotational lines; however, the spectral shifts of the vibronic bands of different isotopic species of formaldehyde are still found to be large enough to permit selective excitation of $CH_2O$, $CHDO$, or $CD_2O$ with ultraviolet light of appropriate wavelengths. This is readily apparent from the absorption spectra of formaldehyde dissolved in liquid Xe (LXe) shown in FIG. 1. These spectra are normalized so that the absorbance of the peak near 338 nm is the same for each isotopic species. The spectral resolution of the spectrophotometer used to obtain these spectra is about 0.2 nm. Contrast ratios as large as four are formed between $CH_2O$ and $CD_2O$. As used in this application, the contrast ratio is defined to be the ratio of absorption cross sections, taken in such a way that the ratio is $>1.0$ at a given wavelength.

Liquid Xe was used in these experiments because it is a very good solvent for formaldehyde. Larger contrast ratios were found when formaldehyde was dissolved in liquid Kr, which is a somewhat poorer solvent.

Using formaldehyde as the feedstock, an advantage of isotope enrichment processes in cryogenic solutions over gaseous processes is that in cryogenic solutions high molecular densities ($\sim 10^{19}$ molecules/cm$^3$) of formaldehyde can be achieved without polymerization, whereas polymerization is rapid above $\sim 5 \times 10^{17}$ molecules/cm$^3$ for the room temperature gas.

Figure 2:
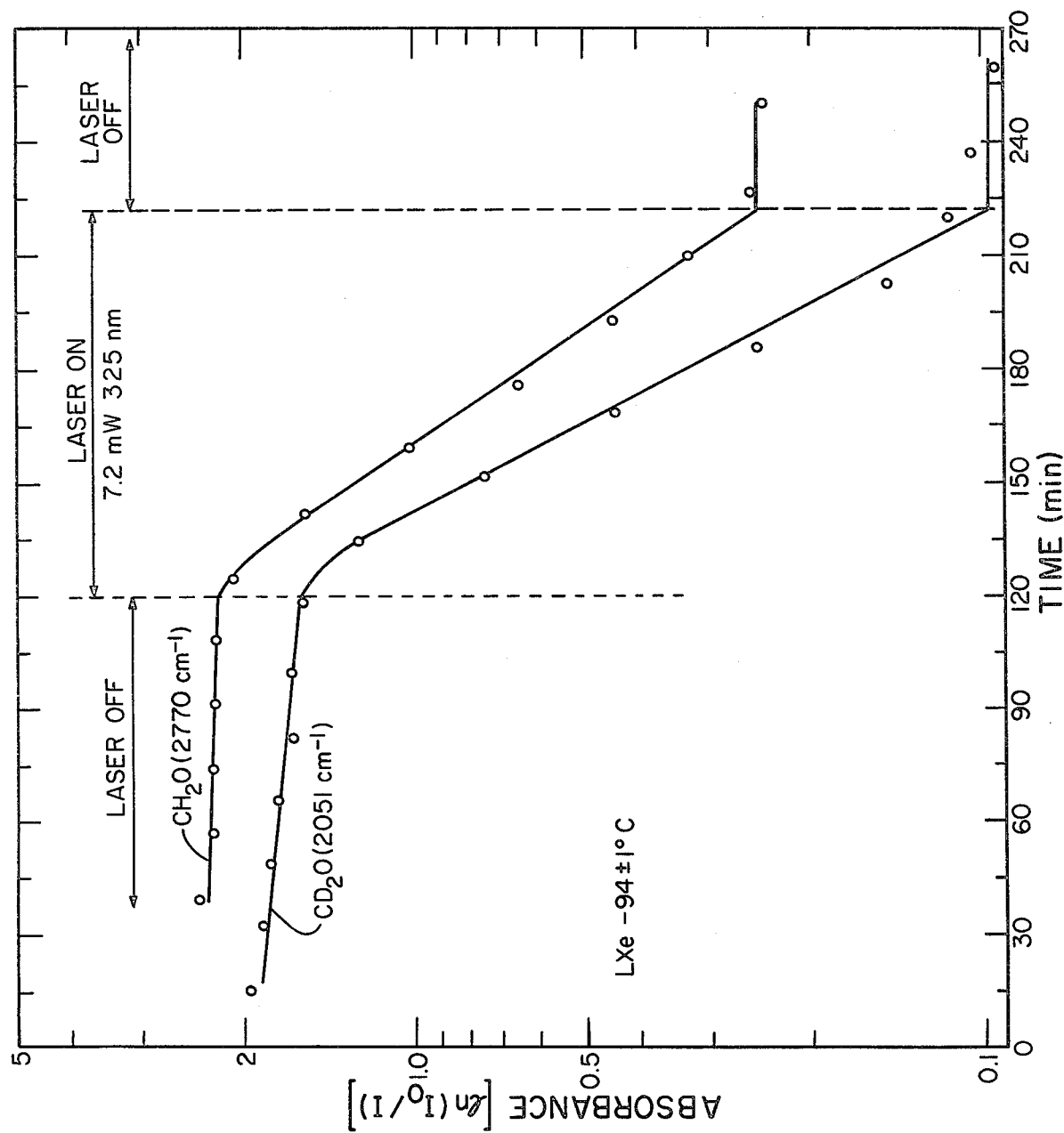
FIG. 2 is a plot of absorbance versus time for a solution of $CH_2O$ and $CD_2O$ in liquid Xe irradiated with 325 nm radiation.

The photolysis of $CH_2O$ and $CD_2O$ in liquid xenon is illustrated in FIG. 2. A mixture of $CH_2O$ and $CD_2O$ was dissolved in liquid xenon at $-106°$ C. and irradiated with 325 nm light from a commercial HeCd laser operating at a power level of 7.2 mW. Peak absorbances of the 2770 cm$^{-1}$ band (peak B, FIG. 3) of $CH_2O$ and of the 2050 cm$^{-1}$ (peak D, FIG. 3) band of $CD_2O$ monitored with a Perkin-Elmer Model 180 spectrophotometer are plotted in this figure. The path length traversed in the solution by the spectrophotometer beam is about 0.45 cm. The adjacent CO band at 2135 cm$^{-1}$ does not overlap the 2050 cm$^{-1}$ band significantly, and nothing has been subtracted from the 2050 cm$^{-1}$ absorbance to obtain the data of this figure. It is obvious that the irradiation causes a rapid reduction in the amounts of both $CD_2O$ and $CH_2O$ in solution. Notice that the rates at which these two species disappear are different. These rates are proportional to the slopes of the lines in FIG. 2 while the laser is on, and are thus in the ratio $$k_{CD_2O}/k_{CH_2O} = 1.28$$

where k's are the rates of disappearance of the species. Two other runs to separate $CH_2O$ from $CD_2O$ are compared with this initial run in the Table. In each instance, the total volume of

| Run | Initial Peak Absorbances | | Sol. Temp. (°C.) | $\dfrac{k_{CD_2O}}{k_{CH_2O}}$ |
| --- | --- | --- | --- | --- |
| | 2770 cm$^{-1}$ ($CH_2O$) | 2051 cm$^{-1}$ ($CD_2O$) | | |
| 1 | 2.3 | 1.9 | −94 | 1.28 |
| 2 | 0.79 | 0.30 | −106 | 1.37 |
| 3 | 0.33 | 0.63 | −106 | 1.16 | the solution is 0.1 cm$^3$, and the solutions are irradiated with 7.2 mW of 325 nm HeCd laser light. Since the relative absorption cross sections for solvated CH$_2$O and CD$_2$O are not known precisely, the relative concentrations of CH$_2$O and CD$_2$O of these runs are also not known with certainty. Nonetheless, the results for runs 2 and 3 are consistent with the data for run 1 given in FIG. 2, despite varying experimental conditions. An average of all attempts gives $$k_{CD_2O}/k_{CH_2O} = 1.27 \pm 0.12.$$

This ratio should be the same as the contrast ratio, r, of the CH$_2$O and CD$_2$O absorption cross sections at 325 nm in FIG. 1, if no exchange or scrambling occurs in the photochemistry. In fact, from FIG. 1 one finds $$r = 1.19,$$

which is smaller than $k_{CD_2O}/k_{CH_2O}$ but is within experimental uncertainty of it.

Figure 3:
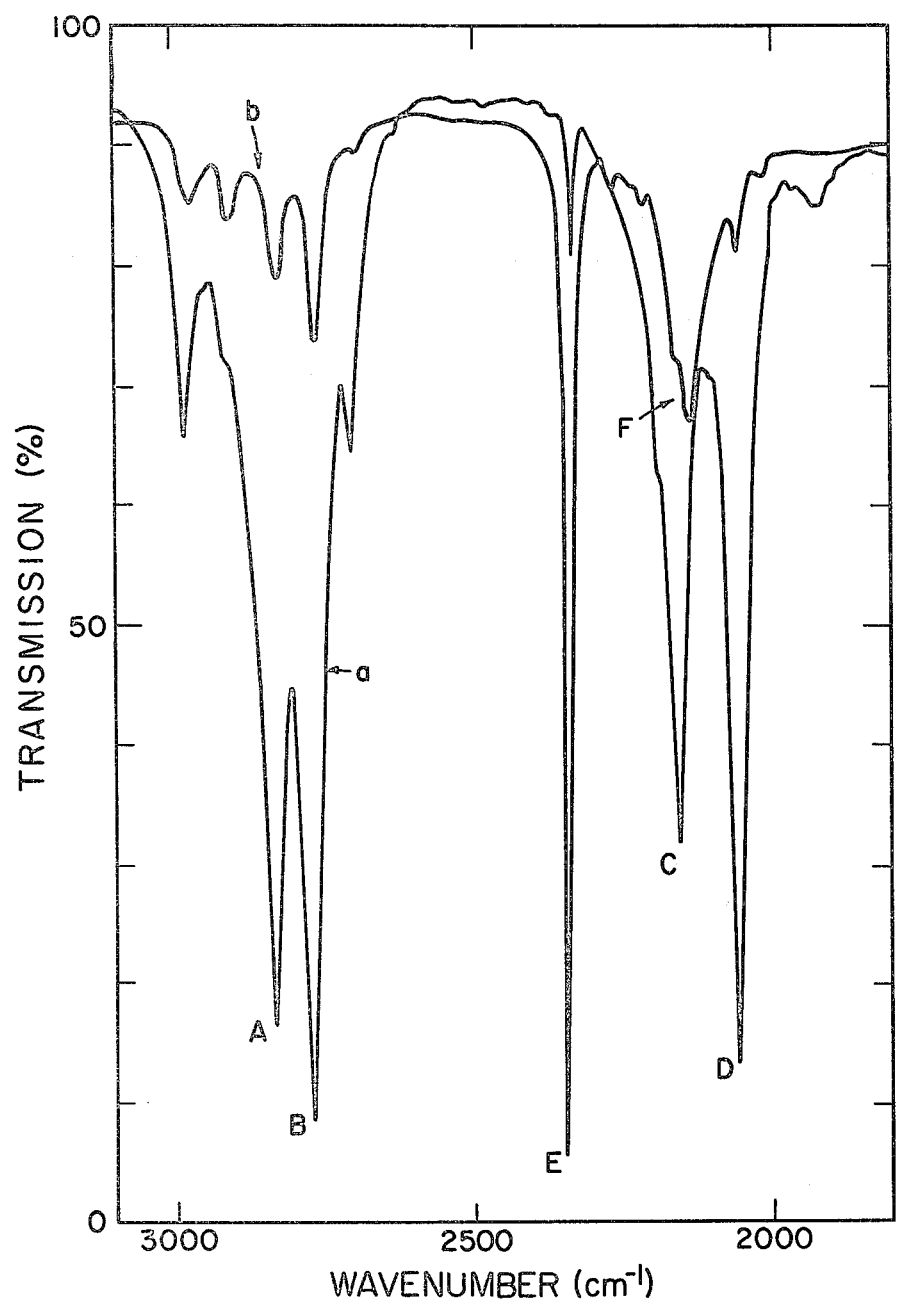
FIG. 3 shows transmission through the solution of FIG. 2 before and after irradiation.

FIG. 3 shows absorption spectra before and after irradiation of the sample for which data are presented in FIG. 2. Curve a was obtained before irradiation. Curve b was obtained after about 102 min of irradiation with 325 nm radiation. Peaks A and B are CH$_2$O absorptions; peaks C and D are CD$_2$O absorptions; and peaks E and F are, respectively, CO$_2$ and CO absorption features. Carbon dioxide and CO are products of the photolysis, so the corresponding features at 2337 cm$^{-1}$ (peak E) and 2135 cm$^{-1}$ (peak F) increase during photolysis. Note that the relative peak heights of the CH$_2$O absorption at 2832 cm$^{-1}$ (peak A) and the CD$_2$O absorption at 2055 cm$^{-1}$ (peak D) reverse during photolysis.

An important advantage of using formaldehyde as the feedstock is that another photolysis product is hydrogen gas which has become enriched in deuterium as a result of the photolysis. This gas is relatively insoluble in the cryogenic liquid and can be readily collected as it bubbles from the solution during photolysis. Thus a simple and straightforward means for separating the enriched product from the feedstock is presented. Further, neither the initial photolytic step nor any chemistry subsequent thereto result in any significant scrambling.

It will be apparent from FIG. 1 that irradiation of appropriate solutions of formaldehyde at selected wavelengths other than 325 nm will dramatically improve the selectivity in this embodiment of the invention.

Although the invention has been described specifically with reference to deuterium enrichment, the present process is also applicable to tritium enrichment in which case the monochromatic radiation may be selected to preferentially or selectively excite those molecules of the feedstock containing tritium.

The foregoing example is merely illustrative of a preferred embodiment of the invention and does not limit in any way the scope of the invention. It will be understood that the scope of the invention is as set forth in the Summary of the Invention and encompassed by the broad claims appended hereto.

What we claim is:

1. A process for separating hydrogen isotopes which comprises (a) forming a liquid phase of hydrogen-bearing feedstock compound at a temperature at which the spectral features of the feedstock compound are narrow enough or the absorption edges sharp enough to permit spectral features corresponding to the different hydrogen isotopes to be separated to be distinguished, (b) irradiating the liquid phase at said temperature with monochromatic radiation of a first wavelength which selectively or at least preferentially excites those molecules of said feedstock compound containing a first hydrogen isotope, and (c) subjecting the excited molecules to physical or chemical processes or a combination thereof whereby said first hydrogen isotope contained in said excited molecules is separated from other hydrogen isotopes contained in the unexcited molecules in said liquid phase.

2. The process of claim 1 wherein said feedstock compound is placed in solution in a solvent which is a liquid at the temperature at which the spectral features of the feedstock compound are narrow enough or the absorption edges sharp enough to permit spectral features corresponding to the different hydrogen isotopes to be distinguished.

3. The process of claim 2 wherein the irradiation is sufficient to photodissociate the excited molecules and the photodissociation product containing said first isotope is separated from the nondissociated molecules of said feedstock compound in said solution.

4. The process of claim 2 wherein said solution has dissolved therein a scavenger compound which reacts rapidly with one or more of the photodissociation products whereby said photodissociation products are unable to recombine to form said feedstock compound and the product containing said first isotope is separated from said solution.

5. The process of claim 2 wherein said solution has dissolved therein a scavenger compound which reacts slowly or not at all with unexcited molecules but rapidly with excited molecules of said feedstock compound in said solution and the reaction product containing said first isotope is separated from said solution.

6. The process of claim 2 wherein said solution is irradiated simultaneously with radiation of a second wavelength sufficient to induce photochemical reaction in those molecules of said feedstock compound excited by the radiation of a first wavelength but not those molecules not excited by said radiation of a first wavelength, and the reaction product containing said first isotope is separated from said solution.

7. The process of claim 6 wherein said photochemical reaction is photodissociation.

8. The process of claim 6 wherein said photochemical reaction is reaction with a scavenger compound dissolved in said solution.

9. The process of claim 2 wherein said solvent is a cryogenic liquid.

10. The process of claim 9 wherein said solvent is liquid Xe, liquid Kr, liquid O$_2$, or liquid Cl$_2$ and said feedstock compound is formic acid, formaldehyde, tetrazine, ketene, methane, or silane.

11. The process of claim 10 wherein said solvent is liquid Xe or liquid Kr and said feedstock compound is formaldehyde.

12. The process of claim 11 wherein said solution is irradiated with monochromatic radiation of a wavelength sufficient to preferentially or selectively photodissociate those formaldehyde molecules containing said first hydrogen isotope and the product hydrogen gas is separated from said solution.

* * * * *